UNITED STATES PATENT OFFICE.

HARRISON GIBSON, OF NGAIRE, NEW ZEALAND, ASSIGNOR TO THE GIBSON PATENT BRAND COMPANY, LIMITED, OF NEW PLYMOUTH, NEW ZEALAND.

BRANDING COMPOSITION.

SPECIFICATION forming part of Reissued Letters Patent No. 11,849, dated August 28, 1900.

Original No. 614,544, dated November 22, 1898. Application for reissue filed November 6, 1899. Serial No. 736,068.

*To all whom it may concern:*

Be it known that I, HARRISON GIBSON, residing at Ngaire, in the Colony of New Zealand, have invented an Improved Branding Composition, of which the following is a specification.

This invention relates to compositions of matter used for branding animals and the like; and the object of the invention is to provide a composition which will preserve its properties when stored in bulk and exposed to the air and whereby branding may be effected without pain and a substantially-permanent mark applied without damage to the hide and at little expense.

With the present manner of branding by a hot iron considerable agony and torture is experienced by animals and the hides are permanently damaged and their value thus reduced.

I am aware that compositions have been produced for accomplishing the object of my invention; but such compositions are less effective than that herein described and must be used without delay after mixing or they will deteriorate and become useless for branding purposes.

The composition consists, essentially, of a depilatory substance combined or mixed, if necessary, with a diluting or thinning material and with material to give proper consistency and adhesive quality to the composition, whereby it may be smeared upon a branding or imprinting implement formed with the required design or mark on its face, and thereby applied to the animal to be marked by pressing the smeared branding instrument upon the animal and causing the composition to be transferred to the hair and to adhere thereto. The composition thus placed upon the animal in the shape of the mark required attacks and destroys the hair, and thus causes a permanent mark, without causing pain to the animal or injury to the hide.

I have discovered that a branding composition may be made from certain sulfids, and preferably from barium sulfid, though good results may be obtained from sulfids of the alkalies or alkaline earths or the chemical equivalents of the same. The sulfid is mixed with ordinary coal-gas tar in equal quantities, by weight, though a useful mixture may be obtained when these proportions vary somewhat. This mixture may, in order that it may readily be applied, then be thinned, and I find that the composition is more readily and effectively used if thinned. For such thinning process I use American potash, which contains a proportion of caustic potash as a depilatory substance, and water mixed together in equal quantities, by measure, and to this mixture I add a quantity of spirits of turpentine equal, by measure, to the American potash and water. A quantity of American potash, water, and spirits of turpentine is added to the mixture of sulfid of barium and coal-gas tar until a consistence of ordinary coal-gas tar is attained. The liquid thus resulting is applied to the hair or wool of the animal to be branded, preferably by means of an ordinary sheep-brand or other suitable branding tool. The hair or wool is destroyed and the hide branded in a substantially permanent and conspicuous manner.

Throughout this specification I have mentioned "coal-gas" tar, as I prefer this kind of tar on account of its efficacy and cheapness; but other tars, such as Stockholm tar, may be used.

Having now particularly described and ascertained the nature of said invention and in what manner the same is to be performed, I declare that what I claim is—

1. A composition for marking animals, consisting of a depilatory substance properly thinned, and a material (such as tar) to give the said depilatory substance consistency and adhesion, whereby it may be applied by a branding or imprinting tool, substantially as described.

2. The improved branding composition consisting of sulfid of barium and coal-gas tar mixed together in the proportions substantially as and for the purposes set forth herein.

3. The improved branding composition consisting of a depilatory sulfid and coal-gas tar mixed together in the proportions substantially as and for the purposes set forth herein.

4. The improved branding composition consisting of sulfid of barium, coal-gas tar, American potash, water and spirits of turpentine mixed together in the proportions substantially as and for the purposes set forth herein.

5. The improved branding compound consisting of sulfid of barium and coal-gas tar in equal quantities by weight, American potash and water in quantities equal to each other by measure and spirits of turpentine equal in quantity by measure to the quantities of potash and water taken together, substantially as described.

6. The improved branding composition consisting of a depilatory sulfid, coal-gas tar, American potash, water and spirits of turpentine mixed together, substantially in the proportions specified.

In witness whereof I have hereunto signed my name in the presence of two subscribing witnesses.

HARRISON GIBSON.

Witnesses:
J. HAROLD MOORE,
WM. G. MALONE.